United States Patent
Kajiyama et al.

(10) Patent No.: US 10,193,141 B2
(45) Date of Patent: Jan. 29, 2019

(54) POSITIVE ELECTRODE MIXTURE AND NON-AQUEOUS ELECTROLYTE SECONDARY BATTERY

(71) Applicants: TODA KOGYO CORP., Hiroshima-shi, Hiroshima-ken (JP); DENKA COMPANY LIMITED, Tokyo (JP)

(72) Inventors: Akihisa Kajiyama, Sanyo Onoda (JP); Teruaki Santoki, Sanyo Onoda (JP); Daisuke Morita, Sanyo Onoda (JP); Ryuta Masaki, Sanyo Onoda (JP); Takahiko Sugihara, Sanyo Onoda (JP); Tsuyoshi Wakiyama, Sanyo Onoda (JP); Kazutoshi Matsumoto, Sanyo Onoda (JP); Akira Yoda, Machida (JP); Taro Inada, Tokyo (JP); Hiroshi Yokota, Machida (JP); Takashi Kawasaki, Machida (JP)

(73) Assignees: TODA KOGYO CORPORATION, Hiroshima (JP); DENKA COMPANY LIMITED, Tokyo (JP)

( * ) Notice: Subject to any disclaimer, the term of this patent is extended or adjusted under 35 U.S.C. 154(b) by 122 days.

(21) Appl. No.: 15/121,110

(22) PCT Filed: Feb. 24, 2015

(86) PCT No.: PCT/JP2015/055226
§ 371 (c)(1),
(2) Date: Aug. 24, 2016

(87) PCT Pub. No.: WO2015/129683
PCT Pub. Date: Sep. 3, 2015

(65) Prior Publication Data
US 2016/0372740 A1 Dec. 22, 2016

(30) Foreign Application Priority Data
Feb. 27, 2014 (JP) .................................. 2014-036292

(51) Int. Cl.
| | |
|---|---|
| H01M 4/36 | (2006.01) |
| H01M 4/525 | (2010.01) |
| H01M 4/62 | (2006.01) |
| H01M 10/0525 | (2010.01) |
| H01M 4/505 | (2010.01) |
| H01M 4/131 | (2010.01) |
| H01M 4/136 | (2010.01) |
| H01M 4/58 | (2010.01) |
| H01M 10/052 | (2010.01) |
| H01M 4/02 | (2006.01) |

(52) U.S. Cl.
CPC ........... *H01M 4/364* (2013.01); *H01M 4/131* (2013.01); *H01M 4/136* (2013.01); *H01M 4/362* (2013.01); *H01M 4/505* (2013.01); *H01M 4/525* (2013.01); *H01M 4/5825* (2013.01); *H01M 4/625* (2013.01); *H01M 10/0525* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2013/0130113 | A1 | 5/2013 | Takano et al. |
| 2013/0209889 | A1* | 8/2013 | Takahata ............... H01G 11/28 429/231.1 |
| 2013/0216913 | A1 | 8/2013 | Tode et al. |

FOREIGN PATENT DOCUMENTS

| | | | |
|---|---|---|---|
| JP | 62-20565 | | 1/1987 |
| JP | 6220565 | * | 1/1987 |
| JP | 2004-207034 | | 7/2004 |
| JP | 2011-34675 | | 2/2011 |
| JP | 2011-129442 | | 6/2011 |
| JP | 2012-38724 | | 2/2012 |
| JP | 2012-216539 | | 11/2012 |
| JP | 2013-25887 | | 2/2013 |
| JP | 2013-171646 | | 9/2013 |
| JP | 2013-254699 | | 12/2013 |
| RU | 2325413 C1 | * | 5/2008 |
| WO | WO-2016080539 A1 | * | 5/2016 ............... C09C 1/48 |

OTHER PUBLICATIONS

International Search Report for PCT/JP2015/055226 dated Apr. 7, 2015, 4 pages.
International Preliminary Report on Patentability issued in PCT/JP2015/055226 dated Aug. 30, 2016.
Extended European Search Report issued in App. No. 15754705.0 dated Jul. 4, 2017.

\* cited by examiner

*Primary Examiner* — Tanisha Diggs
(74) *Attorney, Agent, or Firm* — Nixon & Vanderhye P.C.

(57) ABSTRACT

An object of the present invention is to provide a positive electrode mixture capable of conducting stable charging and discharging with a less amount of gasses generated which has an operating voltage or an initial crystal phase transition voltage of not less than 4.5 V on the basis of lithium. The present invention relates to a positive electrode mixture comprising carbon black having a bulk density of not more than 0.1 g/cm$^3$, a crystallite size of 10 to 40 Å, an iodine adsorption of 1 to 150 mg/g, a volatile content of not more than 0.1% and a metal impurity content of not more than 20 ppm, and a positive electrode active substance having an operating voltage or an initial crystal phase transition voltage of not less than 4.5 V on the basis of lithium.

8 Claims, No Drawings

POSITIVE ELECTRODE MIXTURE AND NON-AQUEOUS ELECTROLYTE SECONDARY BATTERY

This application is the U.S. national phase of International Application No. PCT/JP2015/055226 filed 24 Feb. 2015 which designated the U.S. and claims priority to JP Patent Application No. 2014-036292 filed 27 Feb. 2014, the entire contents of each of which are hereby incorporated by reference.

TECHNICAL FIELD

The present invention relates to a positive electrode (cathode) mixture and a non-aqueous electrolyte secondary battery, and more particularly, to a positive electrode mixture using carbon black which is capable of conducting stable charging and discharging with a less amount of gasses generated when used in a secondary battery of a high-voltage type having an operating voltage or an initial crystal phase transition voltage of not less than 4.5 V on the basis of Li, and a non-aqueous electrolyte secondary battery using the positive electrode mixture.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Also, in consideration of global environments, electric vehicles and hybrid vehicles have been recently developed and put into practice, so that there is an increasing demand for lithium ion secondary batteries used in large size applications which have excellent storage characteristics. Under these circumstances, the high-energy lithium ion secondary batteries having advantages such as a high discharge voltage and a large discharge capacity have been noticed. In particular, in order to apply the lithium ion secondary batteries to electric tools, electric vehicles or the like in which rapid charge/discharge cycle characteristics are needed, it has been required that the lithium ion secondary batteries exhibit excellent rate characteristics.

Hitherto, as a positive electrode (cathode) active substance useful for high energy-type lithium ion secondary batteries exhibiting a 4 V-grade voltage, there are generally known $LiMn_2O_4$ having a spinel structure, $LiCoO_2$, $LiNi_{1/3}Co_{1/3}Mn_{1/3}O_2$ and $LiCo_{1-x-z}Ni_xAl_zO_2$ having a rock-salt type structure, or the like. On the other hand, in order to meet the recent need to enhance an energy density of the secondary batteries, there is an increasing demand for those secondary batteries capable of operating at a higher voltage as a single cell.

However, the secondary batteries operating at a high voltage have posed such a problem that an electrolyte used therein tends to suffer from accelerated deterioration, so that gasses tend to be generated due to the deteriorated electrolyte.

In order to suppress generation of the gasses, the positive electrode active substance, electrolyte, etc., have been improved. In addition, it has been further demanded to improve the carbon black used together with the positive electrode active substance.

As the carbon black, there are known carbon black using two kinds of acetylene blacks for the purpose of exhibiting features inherent to the carbon black, i.e., enhancing an output and a service life of batteries (cited Patent Literature 1), and carbon black using two kinds of carbonaceous materials for the purpose of enhancing characteristics of batteries when used under the aforementioned high voltage conditions (cited Patent Literatures 2 and 3). In addition, it is also known to improve a non-aqueous solvent used in lithium ion secondary batteries (cited Patent Literature 4).

However, at present, in the secondary batteries of a high-voltage type having an operating voltage of not less than 4.5 V on the basis of Li, there is a strong demand for a positive electrode mixture capable of conducting stable charging and discharging with a less amount of gasses generated therefrom. However, any materials capable of satisfying the necessary and sufficient conditions have not been obtained yet.

That is, even the technologies described in the aforementioned Patent Literatures 1 to 4 have failed to improve high-temperature characteristics of the secondary batteries to a sufficient extent.

In the Patent Literature 1, there are present no examples comprehensively describing all of a density, impurities, crystallographic parameters of carbon black as main causes of side reactions owing to the carbon black which occur at an interface between a positive electrode and an electrolyte solution in the range of not less than 4.5 V on the basis of Li.

In the Patent Literatures 2 and 3, as a conductive agent, carbon black is used in combination with black lead, hardly-graphitizable carbon or the like. However, in these Patent Literatures, there is no description concerning use of the carbon black only as the conductive agent.

Further, in the conventional arts, there are described merely the technologies for suppressing deterioration in cycle characteristics of batteries which is caused by expansion and contraction of carbon black owing to anion intercalation in the carbon black as well as reduction in density of a positive electrode mixture in association therewith.

CITATION LIST

Patent Literature

Patent literature 1: Japanese Patent Application Laid-Open (KOKAI) No. 2004-207034
Patent literature 2: Japanese Patent Application Laid-Open (KOKAI) No. 2011-34675
Patent literature 3: Japanese Patent Application Laid-Open (KOKAI) No. 2011-129442
Patent literature 4: Japanese Patent Application Laid-Open (KOKAI) No. 2012-216539

SUMMARY OF INVENTION

Technical Problem

The present invention has been attained in view of the above conventional problems. An object of the present invention is to provide a positive electrode mixture using carbon black which is capable of conducting stable charging and discharging with a less amount of gasses generated when used in a secondary battery of a high-voltage type having an operating voltage or an initial crystal phase transition voltage of not less than 4.5 V on the basis of Li. Also, another object of the present invention is to provide a non-aqueous electrolyte secondary battery using the positive electrode mixture.

Solution to Problem

That is, in a first aspect of the present invention, there is provided a positive electrode mixture comprising carbon black having a bulk density of not more than 0.1 g/cm$^3$, a crystallite size of 10 to 40 Å, an iodine adsorption of 1 to 150 mg/g, a volatile content of not more than 0.1% and a metal impurity content of not more than 20 ppm, and a positive electrode active substance having an operating voltage or an initial crystal phase transition voltage of not less than 4.5 V on the basis of lithium. Also, in a second aspect of the present invention, there is provided a non-aqueous electrolyte secondary battery using the positive electrode mixture according to the first aspect of the present invention.

Advantageous Effects of Invention

In accordance with the present invention, the aforementioned problems can be solved.

DESCRIPTION OF EMBODIMENTS

The present invention is described in more detail below.

The positive electrode mixture of the present invention comprises carbon black having a bulk density of not more than 0.1 g/cm$^3$, a crystallite size of 10 to 40 Å, an iodine adsorption of 1 to 150 mg/g, a volatile content of not more than 0.1% and a metal impurity content of not more than 20 ppm, and a positive electrode active substance.

The carbon black of the present invention has a bulk density of not more than 0.1 g/cm$^3$. By controlling the bulk density of the carbon black to the aforementioned range, the reaction field of side reactions at an interface between an electrolyte solution and the carbon black which is peculiar to reactions in the high-voltage range of batteries can be reduced, so that it is possible to suppress generation of gasses therefrom. The bulk density of the carbon black is preferably in the range of 0.01 to 0.1 g/cm$^3$, and more preferably 0.01 to 0.08 g/cm$^3$.

The carbon black of the present invention has a crystallite size of 10 to 40 Å. The crystallite size as used herein means a thickness of a crystallite in the C-axis direction on (002) plane of the carbon black. By controlling the crystallinity of the carbon black to the aforementioned range, the reaction field of side reactions at an interface between an electrolyte solution and the carbon black which is peculiar to reactions in the high-voltage range of batteries can be reduced, so that it is possible to suppress generation of gasses therefrom. The crystallinity of the carbon black is preferably controlled such that the crystallite size of the carbon black lies in the range of 10 to 35 Å.

The carbon black of the present invention has an iodine adsorption of 1 to 150 mg/g. By controlling the iodine adsorption of the carbon black to the aforementioned range, the reaction field of side reactions at an interface between an electrolyte solution and the carbon black which is peculiar to reactions in the high-voltage range of batteries can be reduced, so that it is possible to suppress generation of gasses therefrom. The iodine adsorption of the carbon black is preferably in the range of 1 to 100 mg/g.

The carbon black of the present invention has a volatile content of not more than 0.1%. By controlling the volatile content of the carbon black to the aforementioned range, it is possible to suppress not only decomposition of the impurities at an initial stage of charging, but also generation of gasses caused thereby. The volatile content of the carbon black is preferably less than 0.05%. The lower limit of the volatile content of the carbon black is usually about 0.01% as a detection limit upon the measurement thereof.

The carbon black of the present invention has a metal impurity content of not more than 20 ppm. By controlling the metal impurity content of the carbon black to the aforementioned range, it is possible to reduce an amount of the metal eluted from the positive electrode mixture under the charged conditions and deposited on a negative electrode (anode). Since the reaction is accompanied with decomposition of an electrolyte solution and generation of gasses, it is necessary to suppress occurrence of the reaction. The metal impurity content of the carbon black is preferably in the range of not more than 5 ppm. The lower limit of the metal impurity content of the carbon black is usually about 0.1 ppm as a detection limit upon the measurement thereof.

In the present invention, the carbon black is used as a conductive agent for the positive electrode mixture. The carbon black is a non-crystalline material, and therefore can be suitably used from such a standpoint that a graphene layer thereof which is activated at a high voltage has a less edge area.

The method for producing the carbon black used in the present invention is not particularly limited. However, the carbon black may be produced by the method utilizing thermal decomposition and combustion reaction of acetylene in which an acetylene gas, an oxygen gas and a hydrogen gas are fed at rates of 12 m$^3$/hr, 9 m$^3$/hr and 0.5 m$^3$/hr, respectively, and mixed with each other under the feed conditions, and the resulting mixture is sprayed from nozzles disposed at a top of a carbon black production furnace (whole furnace length: 5 m; furnace diameter: 0.5 m) to subject the acetylene to the thermal decomposition and combustion reaction at an inside furnace temperature of not lower than 1800° C. (preferably 1800 to 2400° C.).

The content of the carbon black in the positive electrode mixture is usually 1 to 20% by mass, and preferably 3 to 10% by mass.

The positive electrode active substance in the positive electrode mixture according to the present invention is not particularly limited as long as the substance has an operating voltage or an initial crystal phase transition voltage of not less than 4.5 V on the basis of lithium, and is preferably at least one substance selected from the group consisting of Li(M1$_x$Mn$_{2-x}$)O$_4$ wherein x is more than 0 and less than 1 (0<x<1), and M1 is Cr, Co, Ni or Cu; LiM2VO$_4$ wherein M2 is Co or Ni; yLi$_2$MnO$_3$.(1-y)LiM3O$_2$, wherein y is more than 0 and less than 1 (0<y<1), and M3 is Ni, Co, Mn, Fe or Ti; and LiCoPO$_4$.

The positive electrode active substance used in the present invention preferably has an average secondary particle diameter of 2 to 15 µm.

The positive electrode active substance used in the present invention preferably has a BET specific surface area of 0.1 to 4.0 m$^2$/g.

The content of the positive electrode active substance in the positive electrode mixture is usually 80 to 96% by mass, and preferably 85 to 96% by mass.

The positive electrode mixture according to the present invention may also comprise a binder such as polytetrafluoroethylene and polyvinylidene fluoride together with the aforementioned carbon black and positive electrode active substance. The content of the binder in the positive electrode mixture may be selected from any optional range as determined in view of the conventional arts.

Next, the non-aqueous electrolyte secondary battery according to the present invention in described.

The non-aqueous electrolyte secondary battery according to the present invention is constituted of a positive electrode comprising the aforementioned positive electrode mixture, a negative electrode and an electrolyte. The non-aqueous electrolyte secondary battery according to the present invention can be used even under such a condition that the operating voltage or initial crystal phase transition voltage thereof on the basis of lithium is not more than 4.5 V.

Examples of a negative electrode (anode) active substance which may be used in the negative electrode include metallic lithium, lithium/aluminum alloys, lithium/tin alloys, silicon, a silicon/carbon composite and graphite.

Also, as a solvent for the electrolyte solution, there may be used combination of ethylene carbonate (EC) and diethyl carbonate (DEC), as well as an organic solvent comprising at least one compound selected from the group consisting of carbonates having a basic structure constituted of propylene carbonate (PC), dimethyl carbonate (DMC) or the like, and ethers such as dimethoxyethane (DME). In particular, in the case where the operating voltage or initial crystal phase transition voltage of the secondary battery on the basis of lithium is not less than 4.5 V, it has been reported that a solvent prepared by replacing a part of protons of the aforementioned solvent with F is preferably used (cited Patent Literature 4).

Further, as the electrolyte, in addition to lithium phosphate hexafluoride ($LiPF_6$), there may also be used at least one lithium salt selected from the group consisting of lithium perchlorate ($LiClO_4$), lithium borate tetrafluoride ($LiBF_4$) and the like. In particular, even in the case where the operating voltage or initial crystal phase transition voltage of the secondary battery on the basis of lithium is not less than 4.5 V, the electrolyte used therein is not particularly limited.

<Function>

The important point of the present invention resides in such a fact that the non-aqueous electrolyte secondary battery using the positive electrode mixture according to the present invention is capable of conducting stable charging and discharging with a less amount of gasses generated therefrom even when the secondary battery is in the form of a secondary battery of a high-voltage type having an operating voltage or an initial crystal phase transition voltage of not less than 4.5 V on the basis of Li.

In the present invention, by suitably controlling a bulk density, a crystallite size, an iodine adsorption, a volatile content and a metal impurity content of the carbon black, the resulting secondary battery can be prevented from suffering from occurrence of side reactions peculiar to high-voltage conditions, and therefore from generation of gasses therefrom. Examples of the side reactions include intercalation reactions of anions into the carbon black, oxidation of the anions caused along with the reactions, oxidative decomposition of the electrolyte solution in association with the reactions, as well as decomposition of organic impurities, dissolution and precipitation of metal impurities, etc.

The amount of gasses generated per a unit weight of the positive electrode mixture according to the present invention (a total amount of gasses generated) is preferably not more than 30.0 $cm^3/g$ when measured by the method described in Examples below using an electrode produced by compounding 85% by mass of LNMO, 10% by mass of CB and 5% by mass of PVDF.

EXAMPLES

In the following, the present invention is described in more detail by referring to Examples. However, it should be noted that the following Examples are not intended to limit the present invention thereto, and various other changes or modifications can be made without departing from the spirit or scope of the present invention.

The crystallite size of the carbon black was calculated from (002) diffraction line measured by X-ray diffraction method using a Cu-Kα ray according to the following Scherrer's formula.

$$\text{Crystallinity } (Lc)=(180 \cdot K \cdot \lambda)/(\pi \cdot \beta \sim \cos \theta)$$

wherein K is a shape factor (0.9 was used herein); λ is a wavelength of X-ray (1.54 Å); θ is an angle showing a maximum value in the (002) diffraction line; and β is an angle showing a full width at half maximum in the (002) diffraction line.

The iodine adsorption of the carbon black was measured according to JIS K 1474.

The volatile content of the carbon black was determined as follows. That is, the volatile content of the carbon black was defined as a weight loss of the carbon black as measured when the carbon black was held under a vacuum of 3 torr at 950° C. for 10 min.

The metal impurity content of the carbon black was determined as follows. That is, 10 g of the carbonaceous material was heated in air at 700° C. using an electric furnace for 8 hr to subject the material to ashing, and the resulting ash was dissolved with alkali to thereby obtain a solution thereof. The thus obtained solution was subjected to measurement of a metal impurity content thereof using an ICP emission spectroscopic device "ICPE-9000" manufactured by Shimadzu Corp. The metal impurity content of the carbon black was defined as a sum of concentrations of Fe, Ni, Cr and Cu in the carbon black.

The average secondary particle diameter (D50) of the active substance was determined from a volume-based average particle diameter thereof as measured by a wet laser method using a laser type particle size distribution measuring apparatus "MICROTRACK HRA" manufactured by Nikkiso Co., Ltd.

The measurement of the amount of gassed generated from the positive electrode mixture according to the present invention was conducted by evaluation of battery characteristics using a laminate cell having a size of 10 cm×20 cm.

The coin cell used for the evaluation of battery characteristics was produced as follows. That is, 80 to 90% by mass of a composite oxide as positive electrode active substance particles, 5 to 10% by mass of carbon black as a conductive agent, and 5 to 10% by mass of a solution prepared by dissolving polyvinylidene fluoride in N-methyl pyrrolidone as a binder were mixed with each other, and then the resulting mixture was applied onto an Al metal foil, followed by drying the obtained material at 110° C. The thus obtained sheets were each blanked into a size of 4 mm×10 mm, and then compression-bonded together under a pressure of 3.0 $t/cm^2$, and the resulting laminated sheet was used as the positive electrode.

The negative electrode was produced as follows. That is, 94% by mass of spherical artificial graphite and 6% by mass of a solution prepared by dissolving polyvinylidene fluoride in N-methyl pyrrolidone as a binder were mixed with each other, and then the resulting mixture was applied onto a Cu metal foil, followed by drying the obtained material at 110° C. The thus obtained sheets were each blanked into a size of 6 mm×12 mm, and then compression-bonded together under a pressure of 3.0 $t/cm^2$, and the resulting laminated sheet was used as the negative electrode.

A 1 mol/L LiPF$_6$ solution of a mixed solvent comprising EC and DEC in a volume ratio of 1:1 was used as an electrolyte solution, thereby producing the laminate cell having the aforementioned size.

The measurement of the amount of gasses generated at a high temperature was conducted by measuring the change in volume of the aforementioned laminate cell. The laminate cell was once charged at a current density of 0.1 C until reaching a cell voltage of 4.9 V (CC-CV), and then discharged until reaching 3.0 V (CC) to confirm whether the cell was operated under normal conditions.

Thereafter, the cell was charged again at a current density of 0.1 C until reaching 4.9 V (CC-CV). The thus-charged coin cell was dismounted from a charge/discharge device, and then stored at 60° C. for 4 days by allowing the cell to stand under open circuit conditions in a thermostatic chamber.

The volume of the cell was measured before subjecting the cell to the charging and discharging, immediately before placing the cell in the thermostatic chamber and after the elapse of 48 hr from the placement of the cell in the thermostatic chamber, respectively, to thereby record the change in amount of gasses generated therefrom with time. The measurement of the volume of the cell was conducted at a temperature of 25° C. by the Archimedes method. The above procedure was repeatedly carried out at various compounding ratios and with respect to various positive electrode mixtures prepared using various carbon blacks to measure the respective amounts of gasses generated from the laminate cell. Furthermore, the thus measured amounts of gasses generated were subjected to statistical analysis to calculate the amounts of gasses generated which were derived from the respective materials and members including the active substance, carbon black, binder, negative electrode, etc.

Example 1

A composition prepared by compounding 85% by mass of LiNi$_{0.5}$Mn$_{1.5}$O$_4$ spinel (hereinafter referred to merely as "LNMO") as a positive electrode active substance, 10% by mass of carbon black (hereinafter referred to merely as "CB") having a bulk density of 0.04 g/cm$^3$, an iodine adsorption of 92 mg/g, an XRD crystallite size of 35 Å, a volatile content of 0.03% and a metal impurity content of 2 ppm as a conductive agent, and 5% by mass of polyvinylidene fluoride (hereinafter referred to merely as "PVDF") as a binder was defined as a basic formulation for a positive electrode mixture. Further, the aforementioned LNMO, CB and PVDF were compounded at various compositional ratios selected from the ranges of 80 to 90% by mass, 5 to 10% by mass, and 5 to 10% by mass, respectively, to prepare several kinds of positive electrode mixtures. More specifically, an electrode was produced by compounding 80% by mass of the aforementioned LNMO, 10% by mass of the aforementioned CB and 10% by mass of the aforementioned PVDF, and another electrode was produced by compounding 90% by mass of the aforementioned LNMO, 5% by mass of the aforementioned CB and 5% by mass of the aforementioned PVDF. The aforementioned laminate cell produced using the respective thus-produced electrodes was subjected to gas swelling test. More specifically, the laminate cell was stored at 60° C. for 48 hr, and then subjected to measurement of an amount of swelling of the laminate cell. The amounts of gasses generated from the respective electrodes were as follows. That is, the amount of gasses generated from the electrode produced by compounding 85% by mass of LNMO, 10% by mass of CB and 5% by mass of PVDF was 7.9 cm$^3$/g per a unit weight of the electrode, the amount of gasses generated from the electrode produced by compounding 80% by mass of LNMO, 10% by mass of CB and 10% by mass of PVDF was 8.7 cm$^3$/g per a unit weight of the electrode, and the amount of gasses generated from the electrode produced by compounding 90% by mass of LNMO, 5% by mass of CB and 5% by mass of PVDF was 6.9 cm$^3$/g per a unit weight of the electrode. From these results, the influence of the composition of the respective electrodes on the generation of gasses was examined by thus calculating the amounts of gasses generated therefrom. As a result, it was confirmed that the amount of gasses generated from the carbon black (CB) was 25.2 cm$^3$/g. In addition, as a result of the analysis, it was confirmed that the amounts of gasses generated which were derived from the respective components of the positive electrode were 5.0 cm$^3$/g from LNMO, 25.2 cm$^3$/g from CB and 20.8 cm$^3$/g from PVDF, while the amount of gasses generated from the negative electrode was 0.3 cm$^3$/g. It was further confirmed that the amount of gasses generated from the positive electrode mixture having a composition of LNMO/CB/binder of 85/10/5 was 7.9 cm$^3$/g per a unit weight of the positive electrode mixture (as a total amount of gasses generated).

Example 2

A composition prepared by compounding 85% by mass of LNMO as a positive electrode active substance, 10% by mass of CB having a bulk density of 0.10 g/cm$^3$, an iodine adsorption of 5 mg/g, an XRD crystallite size of 20 Å, a volatile content of 0.02% and a metal impurity content of 2 ppm as a conductive agent, and 5% by mass of PVDF was defined as a basic formulation for a positive electrode mixture. Further, several kinds of positive electrode mixtures were prepared in the same manner as in Example 1. The aforementioned laminate cell produced using the respective thus-prepared positive electrode mixtures was subjected to gas swelling test. More specifically, the laminae cell was stored at 60° C. for 48 hr, and then subjected to measurement of an amount of swelling of the laminate cell. As a result, it was confirmed that the amount of gasses generated from the carbon black was 16.4 cm$^3$/g. In addition, as a result of the analysis, it was confirmed that the amounts of gasses generated which were derived from the respective components of the positive electrode were 5.0 cm$^3$/g from LNMO, 16.4 cm$^3$/g from CB and 20.8 cm$^3$/g from PVDF, while the amount of gasses generated from the negative electrode was 0.3 cm$^3$/g. It was further confirmed that the amount of gasses generated from the positive electrode mixture having a composition of LNMO/CB/binder of 85/10/5 was 7.0 cm$^3$/g per a unit weight of the positive electrode mixture.

Example 3

A composition prepared by compounding 85% by mass of LNMO as a positive electrode active substance, 10% by mass of CB having a bulk density of 0.04 g/cm$^3$, an iodine adsorption of 80 mg/g, an XRD crystallite size of 12 Å, a volatile content of 0.03% and a metal impurity content of 2 ppm as a conductive agent, and 5% by mass of PVDF was defined as a basic formulation for a positive electrode mixture. Further, several kinds of positive electrode mixtures were prepared in the same manner as in Example 1. The aforementioned laminate cell produced using the respective thus-prepared positive electrode mixtures was subjected to gas swelling test. More specifically, the laminate cell was stored at 60° C. for 48 hr, and then subjected to measurement of an amount of swelling of the laminate cell. As a result, it was confirmed that the amount of gasses generated from the carbon black was 14.1 cm$^3$/g. In addition, as a result of the analysis, it was confirmed that the amounts of gasses generated which were derived from the respective components of the positive electrode were 5.0 cm$^3$/g from LNMO, 14.1 cm$^3$/g from CB and 20.8 cm$^3$/g from PVDF, while the amount of gasses generated from the negative electrode was 0.3 cm$^3$/g. It was further confirmed that the amount of gasses generated from the positive electrode mixture having a composition of LNMO/CB/binder of 85/10/5 was 6.8 cm$^3$/g per a unit weight of the positive electrode mixture.

Example 4

A composition prepared by compounding 85% by mass of LNMO as a positive electrode active substance, 10% by mass of CB having a bulk density of 0.02 g/cm$^3$, an iodine adsorption of 120 mg/g, an XRD crystallite size of 40 Å, a volatile content of 0.04% and a metal impurity content of 2 ppm as a conductive agent, and 5% by mass of PVDF was defined as a basic formulation for a positive electrode mixture. Further, several kinds of positive electrode mixtures were prepared in the same manner as in Example 1. The aforementioned laminate cell produced using the respective thus-prepared positive electrode mixtures was subjected to gas swelling test. More specifically, the laminate cell was stored at 60° C. for 48 hr, and then subjected to measurement of an amount of swelling of the laminate cell. As a result, it was confirmed that the amount of gasses generated from the carbon black was 27.8 cm$^3$/g. In addition, as a result of the analysis, it was confirmed that the amounts of gasses generated which were derived from the respective components of the positive electrode were 5.0 cm$^3$/g from LNMO, 27.8 cm$^3$/g from CB and 20.8 cm$^3$/g from PVDF, while the amount of gasses generated from the negative electrode was 0.3 cm$^3$/g. It was further confirmed that the amount of gasses generated from the positive electrode mixture having a composition of LNMO/CB/binder of 85/10/5 was 8.1 cm$^3$/g per a unit weight of the positive electrode mixture.

Example 5

A composition prepared by compounding 85% by mass of LNMO as a positive electrode active substance, 10% by mass of CB having a bulk density of 0.04 g/cm$^3$, an iodine adsorption of 90 mg/g, an XRD crystallite size of 10 Å, a volatile content of 0.03% and a metal impurity content of 15 ppm as a conductive agent, and 5% by mass of PVDF was defined as a basic formulation for a positive electrode mixture. Further, several kinds of positive electrode mixtures were prepared in the same manner as in Example 1. The aforementioned laminate cell produced using the respective thus-prepared positive electrode mixtures was subjected to gas swelling test. More specifically, the laminate cell was stored at 60° C. for 48 hr, and then subjected to measurement of an amount of swelling of the laminate cell. As a result, it was confirmed that the amount of gasses generated from the carbon black was 19.0 cm$^3$/g. In addition, as a result of the analysis, it was confirmed that the amounts of gasses generated which were derived from the respective components of the positive electrode were 5.0 cm$^3$/g from LNMO, 19.0 cm$^3$/g from CB and 20.8 cm$^3$/g from PVDF, while the amount of gasses generated from the negative electrode was 0.3 cm$^3$/g. It was further confirmed that the amount of gasses generated from the positive electrode mixture having a composition of LNMO/CB/binder of 85/10/5 was 7.3 cm$^3$/g per a unit weight of the positive electrode mixture.

Comparative Example 1

A composition prepared by compounding 85% by mass of LNMO as a positive electrode active substance, 10% by mass of CB having a bulk density of 0.15 g/cm$^3$, an iodine adsorption of 52 mg/g, an XRD crystallite size of 29 Å, a volatile content of 0.05% and a metal impurity content of 3 ppm as a conductive agent, and 5% by mass of PVDF was defined as a basic formulation for a positive electrode mixture. Further, several kinds of positive electrode mixtures were prepared in the same manner as in Example 1. The aforementioned laminate cell produced using the respective thus-prepared positive electrode mixtures was subjected to gas swelling test. More specifically, the laminate cell was stored at 60° C. for 48 hr, and then subjected to measurement of an amount of swelling of the laminate cell. As a result, it was confirmed that the amount of gasses generated from the carbon black was as large as 56.8 cm$^3$/g. In addition, as a result of the analysis, it was confirmed that the amounts of gasses generated which were derived from the respective components of the positive electrode were 5.0 cm$^3$/g from LNMO, 56.8 cm$^3$/g from CB and 20.8 cm$^3$/g from PVDF, while the amount of gasses generated from the negative electrode was 0.3 cm$^3$/g. It was further confirmed that the amount of gasses generated from the positive electrode mixture having a composition of LNMO/CB/binder of 85/10/5 was 11.1 cm$^3$/g per a unit weight of the positive electrode mixture.

Comparative Example 2

A composition prepared by compounding 85% by mass of LNMO as a positive electrode active substance, 10% by mass of CB having a bulk density of 0.05 g/cm$^3$, an iodine adsorption of 180 mg/g, an XRD crystallite size of 25 Å, a volatile content of 0.05% and a metal impurity content of 2 ppm as a conductive agent, and 5% by mass of PVDF was defined as a basic formulation for a positive electrode mixture. Further, several kinds of positive electrode mixtures were prepared in the same manner as in Example 1. The aforementioned laminate cell produced using the respective thus-prepared positive electrode mixtures was subjected to gas swelling test. More specifically, the laminate cell was stored at 60° C. for 48 hr, and then subjected to measurement of an amount of swelling of the laminate cell. As a result, it was confirmed that the amount of gasses generated from the carbon black was as large as 56.7 cm$^3$/g. In addition, as a result of the analysis, it was confirmed that the amounts of gasses generated which were derived from the respective components of the positive electrode were 5.0 cm$^3$/g from LNMO, 56.7 cm$^3$/g from CB and 20.8 cm$^3$/g from PVDF, while the amount of gasses generated from the negative electrode was 0.3 cm$^3$/g. It was further confirmed that the amount of gasses generated from the positive electrode mixture having a composition of LNMO/CB/binder of 85/10/5 was 11.1 cm$^3$/g per a unit weight of the positive electrode mixture.

Comparative Example 3

A composition prepared by compounding 85% by mass of LNMO as a positive electrode active substance, 10% by mass of CB having a bulk density of 0.08 g/cm$^3$, an iodine adsorption of 42 mg/g, an XRD crystallite size of 60 Å, a volatile content of 0.06% and a metal impurity content of 42 ppm as a conductive agent, and 5% by mass of PVDF was defined as a basic formulation for a positive electrode mixture. Further, several kinds of positive electrode mixtures were prepared in the same manner as in Example 1. The aforementioned laminate cell produced using the respective thus-prepared positive electrode mixtures was subjected to gas swelling test. More specifically, the laminate cell was stored at 60° C. for 48 hr, and then subjected to measurement of an amount of swelling of the laminate cell. As a result, it was confirmed that the amount of gasses generated from the carbon black was as large as 39.2 cm$^3$/g. In addition, as a result of the analysis, it was confirmed that the amounts of gasses generated which were derived from the respective components of the positive electrode were 5.0 cm$^3$/g from LNMO, 39.2 cm$^3$/g from CB and 20.8 cm$^3$/g from PVDF, while the amount of gasses generated from the negative electrode was 0.3 cm$^3$/g. It was further confirmed that the amount of gasses generated from the positive electrode mixture having a composition of LNMO/CB/binder of 85/10/5 was 9.3 cm$^3$/g per a unit weight of the positive electrode mixture.

Comparative Example 4

A composition prepared by compounding 85% by mass of LNMO as a positive electrode active substance, 10% by mass of CB having a bulk density of 0.12 g/cm$^3$, an iodine adsorption of 82 mg/g, an XRD crystallite size of 22 Å, a volatile content of 0.08% and a metal impurity content of 8 ppm as a conductive agent, and 5% by mass of PVDF was defined as a basic formulation for a positive electrode mixture. Further, several kinds of positive electrode mixtures were prepared in the same manner as in Example 1. The aforementioned laminate cell produced using the respective thus-prepared positive electrode mixtures was subjected to gas swelling test. More specifically, the laminate cell was stored at 60° C. for 48 hr, and then subjected to measurement of an amount of swelling of the laminate cell. As a result, it was confirmed that the amount of gasses generated from the carbon black was as large as 44.4 cm$^3$/g. In addition, as a result of the analysis, it was confirmed that the amounts of gasses generated which were derived from the respective components of the positive electrode were 5.0 cm$^3$/g from LNMO, 44.4 cm$^3$/g from CB and 20.8 cm$^3$/g from PVDF, while the amount of gasses generated from the negative electrode was 0.3 cm$^3$/g. It was further confirmed that the amount of gasses generated from the positive electrode mixture having a composition of LNMO/CB/binder of 85/10/5 was 10.7 cm$^3$/g per a unit weight of the positive electrode mixture.

Comparative Example 5

A composition prepared by compounding 85% by mass of LNMO as a positive electrode active substance, 10% by mass of CB having a bulk density of 0.07 g/cm$^3$, an iodine adsorption of 24 mg/g, an XRD crystallite size of 75 Å, a volatile content of 0.52% and a metal impurity content of 25 ppm as a conductive agent, and 5% by mass of PVDF was defined as a basic formulation for a positive electrode mixture. Further, several kinds of positive electrode mixtures were prepared in the same manner as in Example 1. The aforementioned laminate cell produced using the respective thus-prepared positive electrode mixtures was subjected to gas swelling test. More specifically, the laminate cell was stored at 60° C. for 48 hr, and then subjected to measurement of an amount of swelling of the laminate cell. As a result, it was confirmed that the amount of gasses generated from the carbon black was as large as 30.3 cm$^3$/g. In addition, as a result of the analysis, it was confirmed that the amounts of gasses generated which were derived from the respective components of the positive electrode were 5.0 cm$^3$/g from LNMO, 30.3 cm$^3$/g from CB and 20.8 cm$^3$/g from PVDF, while the amount of gasses generated from the negative electrode was 0.3 cm$^3$/g. It was further confirmed that the amount of gasses generated from the positive electrode mixture having a composition of LNMO/CB/binder of 85/10/5 was 8.4 cm$^3$/g per a unit weight of the positive electrode mixture.

In Table 1, properties of CB used as well of gasses generated from the positive electrode mixture are shown. With respect to the amounts of gasses generated from the positive electrode mixture, both the amount of gasses generated per a unit weight of CB among the amounts of gasses generated which were derived from the respective components of the positive electrode mixture, and the amount of gasses generated per a unit weight of the positive electrode mixture are shown.

TABLE 1

| Name of sample | Bulk density (g/cm$^3$) | Iodine adsorption (mg/g) | XRD crystallite size (Å) |
|---|---|---|---|
| Example 1 | 0.04 | 92 | 35 |
| Example 2 | 0.10 | 5 | 20 |
| Example 3 | 0.04 | 80 | 12 |
| Example 4 | 0.02 | 120 | 40 |
| Example 5 | 0.04 | 90 | 10 |
| Comparative Example 1 | 0.15 | 52 | 29 |
| Comparative Example 2 | 0.05 | 180 | 25 |
| Comparative Example 3 | 0.08 | 42 | 60 |
| Comparative Example 4 | 0.12 | 82 | 22 |
| Comparative Example 5 | 0.07 | 24 | 75 |

| | Index of impurity contents | | Amount of gasses generated | Amount of gasses generated (per unit weight of |
|---|---|---|---|---|
| Name of sample | Volatile content (%) | Metal impurity content (ppm) | (per unit weight of CB) 48 hr (cm$^3$/g) | positive electrode mixture) (LNMO/CB/PVDF = 85/10/5) 48 hr (cm$^3$/g) |
| Example 1 | 0.03 | 2 | 25.2 | 7.9 |
| Example 2 | 0.02 | 2 | 16.4 | 7.0 |
| Example 3 | 0.03 | 2 | 14.1 | 6.8 |
| Example 4 | 0.04 | 2 | 27.8 | 8.1 |
| Example 5 | 0.03 | 15 | 19.0 | 7.3 |
| Comparative Example 1 | 0.05 | 3 | 56.8 | 11.1 |
| Comparative Example 2 | 0.05 | 2 | 56.7 | 11.1 |
| Comparative Example 3 | 0.06 | 42 | 39.2 | 9.3 |
| Comparative Example 4 | 0.08 | 8 | 44.4 | 10.7 |
| Comparative Example 5 | 0.52 | 25 | 30.3 | 8.4 |

As shown in Table 1, when using the positive electrode mixtures according to the present invention, the amount of gasses generated from the carbon black was not more than 30 cm$^3$/g. Therefore, it was confirmed that the amounts of gasses generated from the positive electrode mixtures according to the present invention were reduced as compared to the amounts of gasses generated from the positive electrode mixtures obtained in Comparative Examples.

The invention claimed is:

1. A positive electrode mixture comprising carbon black having a bulk density of not more than 0.1 g/cm$^3$, a crystallite size of 10 to 40 Å, an iodine adsorption of 1 to 150 mg/g, a volatile content of not more than 0.1% and a metal impurity content of not more than 20 ppm, and a positive electrode (cathode) active substance having an operating voltage or an initial crystal phase transition voltage of not less than 4.5 V on the basis of lithium.

2. The positive electrode mixture according to claim 1, wherein the positive electrode active substance is at least one substance selected from the group consisting of Li(M1$_x$Mn$_{2-x}$)O$_4$ wherein x is more than 0 and less than 1 (0<x<1), and M1 is Cr, Co, Ni or Cu; LiM2VO$_4$ wherein M2 is Co or Ni; yLi$_2$MnO$_3$.(1−y)LiM3O$_2$ wherein y is more than 0 and less than 1 (0<y<1), and M3 is Ni, Co, Mn, Fe or Ti; and LiCoPO$_4$.

3. The positive electrode mixture according to claim 1, wherein a content of the carbon black in the positive electrode mixture is 1 to 20% by mass.

4. A non-aqueous electrolyte secondary battery comprising the positive electrode mixture as claimed in claim 1.

5. A positive electrode mixture comprising carbon black having a bulk density of not more than 0.1 g/cm$^3$, a crystallite size of 10 to 40 Å, an iodine adsorption of 1 to 150 mg/g measured according to JIS K 1474, a volatile content of not more than 0.1% and a metal impurity content of not more than 20 ppm, and a positive electrode (cathode) active substance having an operating voltage or an initial crystal phase transition voltage of not less than 4.5 V on the basis of lithium.

6. The positive electrode mixture according to claim 5, wherein the positive electrode active substance is at least one substance selected from the group consisting of Li(M1$_x$Mn$_{2-x}$)O$_4$ wherein x is more than 0 and less than 1 (0<x<1), and M1 is Cr, Co, Ni or Cu; LiM2VO$_4$ wherein M2 is Co or Ni; yLi$_2$MnO$_3$.(1−y)LiM3O$_2$ wherein y is more than 0 and less than 1 (0<y<1), and M3 is Ni, Co, Mn, Fe or Ti; and LiCoPO$_4$.

7. The positive electrode mixture according to claim 5, wherein a content of the carbon black in the positive electrode mixture is 1 to 20% by mass.

8. A non-aqueous electrolyte secondary battery comprising the positive electrode mixture as claimed in claim 5.

* * * * *